F. H. JOHNSTON AND J. C. CHRISTENSEN.
PULLEY AND LIKE ELEMENT.
APPLICATION FILED OCT. 14, 1918.
1,337,136.
Patented Apr. 13, 1920.
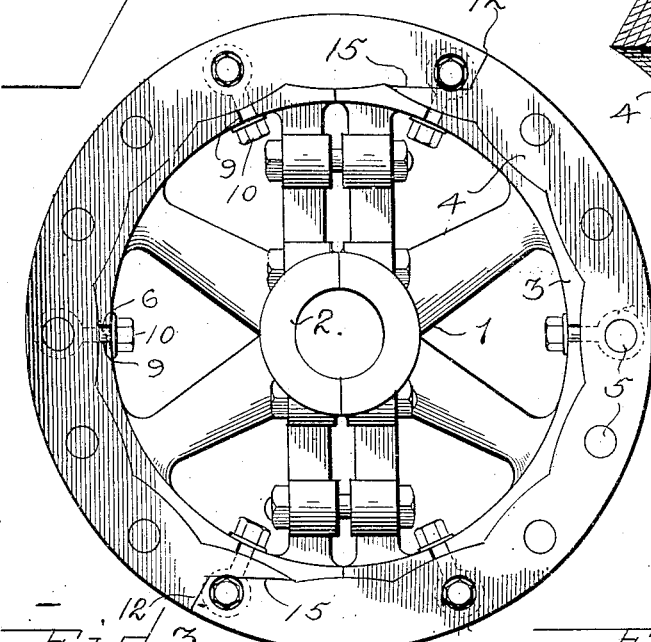
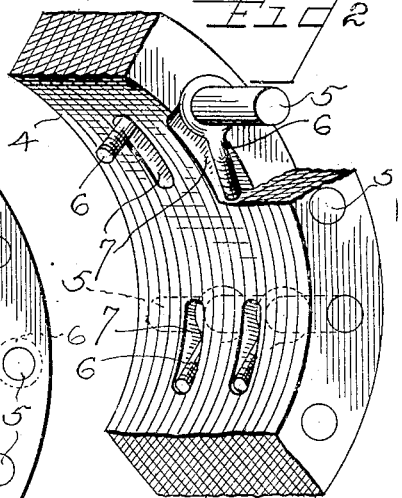
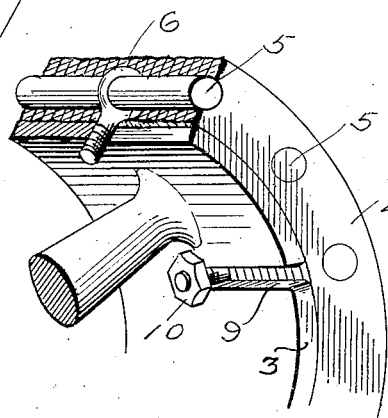
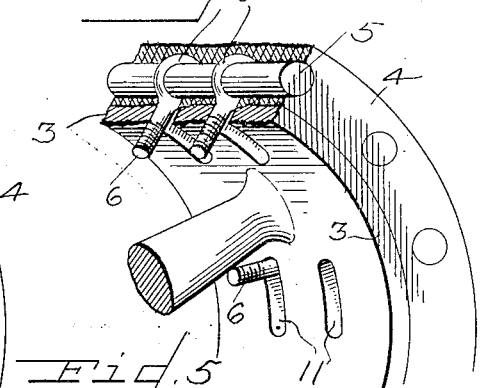
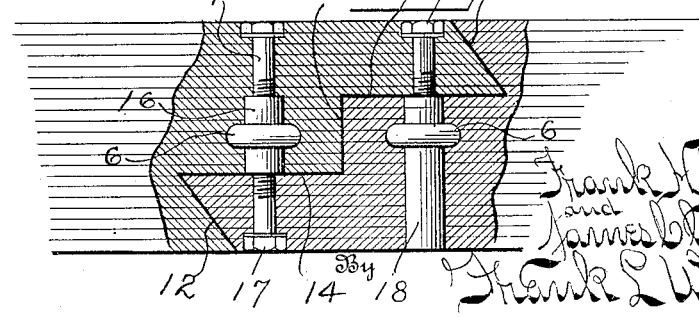
Inventors
Frank H. Johnston
and
James C. Christensen
By Frank L. Walker
Attorney

UNITED STATES PATENT OFFICE.

FRANK H. JOHNSTON AND JAMES C. CHRISTENSEN, OF INDIANAPOLIS, INDIANA.

PULLEY AND LIKE ELEMENT.

1,337,136.  Specification of Letters Patent.  Patented Apr. 13, 1920.

Application filed October 14, 1918. Serial No. 258,033.

*To all whom it may concern:*

Be it known that we, FRANK H. JOHNSTON and JAMES C. CHRISTENSEN, both citizens of the United States, residing at Indianapolis, in the county of Marion and State of Indiana, have invented certain new and useful Improvements in Pulleys and like Elements, of which the following is a specification.

Our invention relates to improvements in pulleys, friction wheels, and like elements having an independently formed rim or facing, and more particularly to means for attaching the rim or facing members to the main or foundation members and one to another. While the invention has been herein shown and described in conjunction with a wheel of laminated construction, commonly known as a "paper pulley" for which it is particularly adapted, it is to be understood that it is not limited to such construction, but may be applied to constructions in which the rim or facing comprises a solid or integral body.

The object of the invention is to simplify and improve the structure as well as the means and mode of operation of such devices whereby they will not only be cheapened in construction, but will be more efficient in operation, positive in driving action, easily assembled and unlikely to get out of repair.

A further object of the invention is to provide a new and novel means for removably attaching the driving rim or facing to the main body of the pulley or wheel, and further in the case of split pulleys or wheels to provide an improved form or joint for the sections of the facing or rim.

With the above primary and other incidental objects in view as will more fully appear in the specification, the invention consists of the features of construction, the parts and combinations thereof, and the mode of operation, or their equivalents, as hereinafter described and set forth in the claims.

Referring to the drawings, Figure 1 is a side elevation of a split pulley embodying the present invention. Fig. 2 a detail perspective view of a section of the friction rim or facing removed from the main body. Fig. 3 is a detail perspective view of a portion of the pulley body to which a section of rim has been applied. Fig. 4 is a similar view illustrating a modification of the construction shown in Fig. 3. Fig. 5 is a detail plan view of the connecting joint of the rim or facing sections of a split or sectional unit. Like parts are indicated by similar characters of reference throughout the several views.

In the drawings 1—1 are the separable sections of a split or sectional pulley body consisting of the hub or sleeve 2, and flange or rim base 3 connected with the hub by the arms or spokes.

It is to be understood that the invention is in no way limited to a split or sectional pulley, but may be applied to solid pulleys, web pulleys, disks and wheels of other constructions.

The rim 4 may be of paper, card or straw board, tarred board, fiber, leather, fabric, wood, composition, or other suitable material and may or may not be laminated as is found desirable for the particular conditions of use.

The peripheral face of the flange or rim base 3 may be circular and concentric with the center of the hub, but is preferably, though not necessarily, of concaved polygonal form as shown in Fig. 1 and as described and claimed in co-pending application, Serial No. 258,031.

This form however is not essential to the invention.

The rim 4 whether of laminated or solid construction is provided at intervals with dowel pins 5 extending transversely therethrough. Carried upon the dowel pins and projecting inwardly are a plurality of eye bolts 6. The eye bolts may be assembled on the dowels during the assembly of the laminæ in such a construction, or in a solid construction they may be inserted in holes or pockets in the rim body and the dowels passed therethrough.

The rim body 4 is provided with a plurality of pockets or recesses 7 in its inner face into which the eye bolts 6 may be retracted by oscillating them laterally about the dowel pins 5 as shown at 8 in Fig. 2. By so retracting the bolts 6 into the pockets 7 the interior face of the rim body may be machined or turned to the required diameter without interference from said eye bolts. The interior of the rim is thus turned or finished to agree with the flange or base rim 3. In the case of a circular faced flange it is finished to the same radius or diameter, while in the case of a concaved polygonal form it is finished to a size intermediate the maximum and minimum diameters, after which the polygonal flange or rim base is pressed into place as described in the copending application before mentioned.

The eye bolts 6 being extended into radial positions after the completion of the turning or finishing of the interior face of the rim 4, are engaged in transverse slots 9 formed in the flange or rim base 3. These slots 9 extend transversely from one side of the flange to a medial point as shown in Fig. 3. Nuts 10 threaded upon the eye bolts 6 serve to retain the rim 4 in adjusted position.

In Fig. 4 there is shown a series of circumferential slots 11 positioned to register with the pockets or recesses 7. In this construction the rim 4 is applied to the pulley body before the eye bolts are withdrawn from their retracted positions within the pockets or recesses 7. After being applied to the pulley body in such position that the pockets 7 register with the slots 11, the eye bolts are turned to radial positions by a suitable tool and the retaining nuts before mentioned are applied to the bolts. Either of these constructions are such that the eye bolts hold the rim 4 against slippage upon the flange 3 and serve to resist the torsional strains thereby affording a positive driving engagement between the rim and pulley body.

When the invention is applied to a split pulley as shown in Fig. 1 the sections of the rim 4 are preferably joined one to the other by an overlapping splice or joint in addition to the inter-connection of the portions of the main pulley body. Such a joint is shown in Fig. 5 in which each of the overlapping tongues of the rim 4 is formed with an inclined or beveled extremity 12 agreeing with the angularity of a reëntering notch or recess in the opposing rim member within which the beveled or inclined end abuts. Intermediate the inclined abutments 12 is a right angle abutting joint 13 the ends of which are connected with the inner ends of the bevels 12 by lines of separation 14.

On account of the necessity of separating the parts by a straight lateral movement the abutments 12 do not extend entirely through the rim 4 but the overlapping tongues are flattened on their inner faces to permit the sections to be drawn apart. Hence the abutments 12 extend only to a line of separation 15 tangential to the flange or rim base 3 at the point of separation of the latter. This forms a feather-edged tongue 15 on each section which is overlaid by the tongue of the opposing member.

Extending through such overlapping portions of the rim are attachment means which may consist of either of a short dowel sleeve 16 embedded in the material of the rim and engaged by studs or bolts 17 extending from opposite sides of the rim, or the dowel sleeve may be of greater length, extending from the line of separation 14 to the exterior face of the rim member as at 18 and be engaged by a single stud or bolt 19 extending through the tongue of the opposing rim member. In the event that the rim is built up in three sections or rings to be later joined side by side, the first form of attachment, shown at the left in Fig. 5 is to be preferred.

Mounted on the dowel sleeves 16 and 18 are eye bolts 6 as before described which engage the aforementioned slots in the flange or rim base 3 to retain the rim members in adjusted positions thereon and to afford positive driving connections. The beveled abutments 12 of this splice or joint maintain the exact alinement of the rim members and are supplemented by the intermediate straight abutment 13 to afford a direct driving action.

From the above description, it will be apparent that there is thus provided a device of the character described, possessing the particular features of advantage before enumerated as desirable, but which obviously is susceptible of modification in its form, proportions, detail construction or arrangement of parts without departing from the principle involved or sacrificing any of its advantages.

While in order to comply with the statute, the invention has been described in language more or less specific as to certain structural features, it is to be understood that the invention is not limited to the specific details shown, but that the means and construction herein described comprise but one mode of putting the invention into effect, and the invention is therefore claimed in any of its possible forms or modifications within the legitimate and valid scope of the appended claims.

Having thus described our invention, we claim:—

1. A machine element of the character described, including a main body having a peripheral rim and a facing annulus encircling the rim, characterized by a plurality of movable attachment members mounted in the facing annulus, pockets in the inner face of the annulus into which the attachment members are retractable, said attachment members when extended being detachably engageable with the rim of said main body.

2. In a machine element of the character described, including a main body having a rim, a facing annulus encircling the rim, and a series of transverse pins embedded in said annulus, characterized by detachable interconnections between the said transverse pins and the rim of the main body.

3. In a machine element of the character described, including a main body having a rim, a facing annulus encircling the rim, and a series of transverse pins embedded in said annulus, characterized by a series of eye bolts through the eyes of which said transverse pins extend said bolts being detachably engaged with the rim of the main body.

4. In a machine element of the character described, including a main body having a rim, a facing annulus encircling the rim, and a series of transverse pins embedded in said annulus, characterized by a series of attachment members pivotally mounted upon the said transverse pins, the inner surface of the facing annulus having therein recesses into which the pivotally mounted attachment members may be oscillated, said attachment members and the rim of the main body being adapted for detachable interengagement.

5. In a machine element of the character described, including a main body having a rim, a facing annulus encircling the rim, and a series of transverse pins embedded in said annulus characterized by a series of attachment members projecting inward from the inner face of the facing annulus, the rim of the main member having therein a series of slots in which said attachment members detachably engage.

6. In a machine element of the character described, including a main body having a rim, a facing annulus encircling the rim, and a series of transverse pins embedded in said annulus, characterized by a series of detachable links connecting between said transversely arranged pins and the rim of the main body.

7. A machine element of the character described, including a main body having a peripheral rim, a facing annulus encircling said rim and formed in separable sections, characterized by overlapping joints between the successive sections of the facing annulus, transverse connections extending through the overlapping portions of the said joints, and interconnections between said transverse connections and said rim.

8. A machine element of the character described, including a main body having a peripheral rim, a facing annulus encircling said rim and formed in separable sections, characterized by overlapping portions joining successive sections of the annulus, a screw threaded sleeve embedded in one of the overlapping portions of the annulus sections, a screw threaded stud extending through the other overlapping portion, and an interconnection between said sleeve and the rim of the main member.

9. A machine element of the character described, including a main body having a peripheral rim, a facing annulus encircling said rim and formed in separable sections, characterized by overlapping tongues on each of opposing sections, said tongues each having a beveled terminal abutment upon the opposing section, said tongues having substantially right angle shoulders abutting one upon the other intermediate their beveled terminal abutments, and means for attaching the overlapping tongues one to the other.

10. A machine element of the character described, including a main body having a peripheral rim, a facing annulus encircling said rim and formed in separable sections, characterized by overlapping double shouldered extensions upon the separable sections of the annulus, and transverse connections extending through the overlapping extensions of successive sections of the annulus.

11. A machine element of the character described, including a main body having a peripheral rim, a facing annulus encircling said rim and formed in separable sections, characterized by overlapping double shouldered extensions upon the separable sections of the annulus, one of the abutting shoulders of each annulus section being inclined in relation with the direction of the other shoulder thereof and interconnecting means between the overlapping portions.

12. A machine element of the character described, including a substantially circular main body and a facing annulus engaging the periphery of said main body, characterized by a plurality of radially disposed attachment members projecting from the interior face of the annulus into engagement with the main body and adapted to detachably connect said main body and annulus one with the other, substantially as specified.

In testimony whereof we have hereunto set our hands this 17th day of August, A. D. 1918.

FRANK H. JOHNSTON.
JAMES C. CHRISTENSEN.

Witnesses:
C. L. COEN,
S. A. CLINCHENS.